(12) United States Patent
Montoya et al.

(10) Patent No.: US 10,571,569 B2
(45) Date of Patent: *Feb. 25, 2020

(54) METHODS AND APPARATUS FOR PHASED ARRAY IMAGING

(71) Applicant: Massachusetts Institute of Technology, Cambridge, MA (US)

(72) Inventors: Juan C. Montoya, Belmont, MA (US); Antonio Sanchez-Rubio, Lexington, MA (US); Harold C. Payson, Lexington, MA (US); Robert E. Hatch, Boxborough, MA (US); Richard Heinrichs, Arlington, VA (US); Dale G. Fried, Dover, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/103,317

(22) Filed: Aug. 14, 2018

(65) Prior Publication Data
US 2019/0064357 A1    Feb. 28, 2019

Related U.S. Application Data

(63) Continuation of application No. 14/939,213, filed on Nov. 12, 2015, now Pat. No. 10,073,177.
(Continued)

(51) Int. Cl.
*G01C 3/08*    (2006.01)
*G01S 17/10*   (2020.01)
(Continued)

(52) U.S. Cl.
CPC ............. *G01S 17/10* (2013.01); *G01S 7/484* (2013.01); *G01S 7/4815* (2013.01);
(Continued)

(58) Field of Classification Search
CPC .......... G01S 17/32; G01S 17/42; G01S 17/89; G01S 17/10; G01S 7/4815; G01S 7/4816; G01S 7/4863; G01S 7/499; G01S 7/484
(Continued)

(56) References Cited

U.S. PATENT DOCUMENTS 5,892,575 A    4/1999  Marino
6,563,105 B2   5/2003  Seibel et al.
(Continued)

OTHER PUBLICATIONS

Albota, M. A. et al., "Three-dimensional imaging laser radar with a photon-counting avalanche photodiode array and microchip laser," Appl. Opt. 41, 7671-7678 (2002).
(Continued)

*Primary Examiner* — Mark Hellner
(74) *Attorney, Agent, or Firm* — Smith Baluch LLP

(57) ABSTRACT

A method of imaging a scene includes generating a temporally varying optical intensity pattern from at least one continuous wave (CW) light beam. The method also includes illuminating at least one portion of the scene with the temporally varying optical intensity pattern so as to cause a photon to scatter or reflect off the at least one portion of the scene. The photon reflected or scatted from the at least one portion of the scene is detected using a single-photon detector. Based on the temporally varying optical intensity pattern and a time of flight of the photon detected, a distance between the single-photon detector and the at least one portion of the scene is estimated.

18 Claims, 5 Drawing Sheets

Related U.S. Application Data

(60) Provisional application No. 62/079,729, filed on Nov. 14, 2014.

(51) Int. Cl.
*G01S 7/484* (2006.01)
*G01S 17/32* (2020.01)
*G01S 17/42* (2006.01)
*G01S 17/89* (2020.01)
*G01S 7/481* (2006.01)
*G01S 7/4863* (2020.01)
*G01S 7/499* (2006.01)

(52) U.S. Cl.
CPC .......... *G01S 7/4816* (2013.01); *G01S 7/4817* (2013.01); *G01S 7/4863* (2013.01); *G01S 7/499* (2013.01); *G01S 17/32* (2013.01); *G01S 17/42* (2013.01); *G01S 17/89* (2013.01)

(58) Field of Classification Search
USPC ....................................................... 356/5.01
See application file for complete search history.

(56) References Cited

U.S. PATENT DOCUMENTS

| | | | |
|---|---|---|---|
| 8,279,420 B2 * | 10/2012 | Ludwig | G01S 17/89 356/3.01 |
| 8,355,117 B2 | 1/2013 | Niclass | |
| 9,625,580 B2 | 4/2017 | Kotelnikov et al. | |
| 10,073,177 B2 | 9/2018 | Montoya et al. | |

OTHER PUBLICATIONS

Fan, T.Y., "Laser beam combining for high-power, high-radiance sources," IEEE J. Set. Top. Quantum Electron. 11, 567-577 (2005).
Fouche, D.G., "Detection and false-alarm probabilities for laser radars that use Geiger-mode detectors," Appl. Opt. 42, 5388-5398 (2003).
Gatt, P. et al., "Dead-time effects on Geiger-mode APD performance," Proc. SPIE 6550, 65500I (2007).
Heinrichs, R. B. et al., "Three-dimensional laser radar with APD arrays," Proc. SPIE 4377, 106-117 (2001).
Huang, W.R. et al., "High speed, high power one-dimensional beam steering from a 6-element optical phased array," Opt. Express 20, 17311-17318 (2012).
Montoya, J. et al., "External cavity beam combining of 21 semiconductor lasers using SPGD," Appl. Opt. 51, 1724-1728 (2012).
Montoya, J. et al., "Optical phased-array ladar," Applied Optics, vol. 53, Issue 31, pp. 7551-7555 (2014).
Redmond, S. M. et al., "Active coherent beam combining of diode lasers," Opt. Lett. 36, 999-1001 (2011).
Redmond, S.M. et al., "Diffractive coherent combining of a 2.5 kW fiber laser array into a 1.9 kW gaussian beam," Opt. Lett. 37, 2832-2834 (2012).
Verghese, S. et al., "Arrays of InP-based avalanche photodiodes for photon counting," IEEE J. Sel. Top. Quantum Electron. 13, 870-886 (2007).
Vorontsov, M.A. et al., and V. P. Sivokon, "Stochastic parallel-gradient-descent technique for high-resolution wave-front phase-distortion correction," J. Opt. Soc. Am. A 15, 2745-2758 (1998).

* cited by examiner

METHODS AND APPARATUS FOR PHASED ARRAY IMAGING

CROSS-REFERENCES TO RELATED APPLICATIONS

This application is a continuation of U.S. application Ser. No. 14/939,213, now U.S. Pat. No. 10,073,177, filed Nov. 12, 2015, entitled "METHODS AND APPARATUS FOR PHASED ARRAY IMAGING," which claims priority, under 35 U.S.C. 119(e), to U.S. Application No. 62/079,729, filed Nov. 14, 2014, entitled "OPTICAL PHASED ARRAY LADAR." Each of these applications is hereby incorporated herein by reference in its entirety.

GOVERNMENT SUPPORT

This invention was made with Government support under Contract No. FA8721-05-C-0002 awarded by the U.S. Air Force. The Government has certain rights in the invention.

BACKGROUND

There are generally two types of remote sensing technologies: passive sensing and active sensing. In passive sensing, images or other representations of a target are created by detecting radiation that is generated by an external source, such as the sun. In contrast, active sensing technologies not only detect radiation reflected or scattered by a target but also generate the radiation to illuminate the target for subsequent detection.

Light Detection and Ranging (LIDAR, also known as LADAR) is an active sensing technique that involves emitting light (e.g., pulses from a laser) and detecting the reflected or scattered light. LIDAR typically measures the time-of-flight (i.e., the time it takes for the pulse to travel from the transmitter to the target, be reflected, and travel back to the sensor), which can be used to derive ranges (or distances) to the target which reflects or scatters the light. In this manner, LIDAR is analogous to radar (radio detecting and ranging), except that LIDAR is based on optical waves instead of radio waves.

LIDAR can be airborne or ground-based. Airborne LIDAR typically collects data from airplanes looking down and covering large areas of the ground. LIDAR can also be conducted from ground-based stationary and mobile platforms. Ground-based LIDAR techniques can be beneficial in producing high accuracies and point densities, thus permitting the development of precise, realistic, three-dimensional representations of scenes such as railroads, roadways, bridges, buildings, breakwaters, or shoreline structures.

SUMMARY

Embodiments of the present invention include apparatus, systems, and methods of imaging a scene using sparse apertures. In one example, a method of imaging a scene includes generating a temporally varying optical intensity pattern from at least one continuous wave (CW) light beam. The method also includes illuminating at least one portion of the scene with the temporally varying optical intensity pattern so as to cause a photon to scatter or reflect off the at least one portion of the scene. The photon reflected or scatted from the at least one portion of the scene is detected using a single-photon detector. Based on the temporally varying optical intensity pattern and a time of flight of the photon detected, a distance between the single-photon detector and the at least one portion of the scene is estimated.

In another example, an apparatus for imaging a scene includes a phased array, at least one single-photon detector, and a processor. The phased array illuminates a portion of the scene with a time-varying optical intensity pattern generated from at least one continuous wave (CW) light beam so as to cause a photon to scatter or reflect from the portion of the scene. The single-photon detector is in optical communication with the phased array and detects the photon scattered or reflected by the portion of the scene. The processor is operably coupled to single-photon detector to estimate a distance between the at least one single photon detector and the portion of the scene based on a time of flight of the photon.

In yet another example, an apparatus for imaging a scene includes a transmitter to illuminate at least one portion of the scene with a spatiotemporally varying interference pattern, an array of single-photon detectors to detect at least one photon reflected or scattered from the at least first one portion of the scene, and a processor, operably coupled to the array of single-photon detector, to estimate a time of flight of the photon based on the spatiotemporally varying interference pattern. The transmitter further includes a continuous wave (CW) laser source to provide at least one continuous wave (CW) light beam. The transmitter also includes a phased array, in optical communication with the at least one CW laser source, to generate the spatiotemporally varying interference pattern from the at least one continuous wave (CW) light beam. A first detector in the transmitter is in optical communication with the phased array and measures an intensity at a center of the spatiotemporally varying interference pattern. A controller, operably coupled to the first detector, applies a periodic phase setting, at a repetition rate substantially equal to or greater than 20 MHz, to the phased array and to change the periodic phase setting of the phased array based at least in part on the intensity measured by the first detector.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

DETAILED DESCRIPTION

Overview

Figure 1:
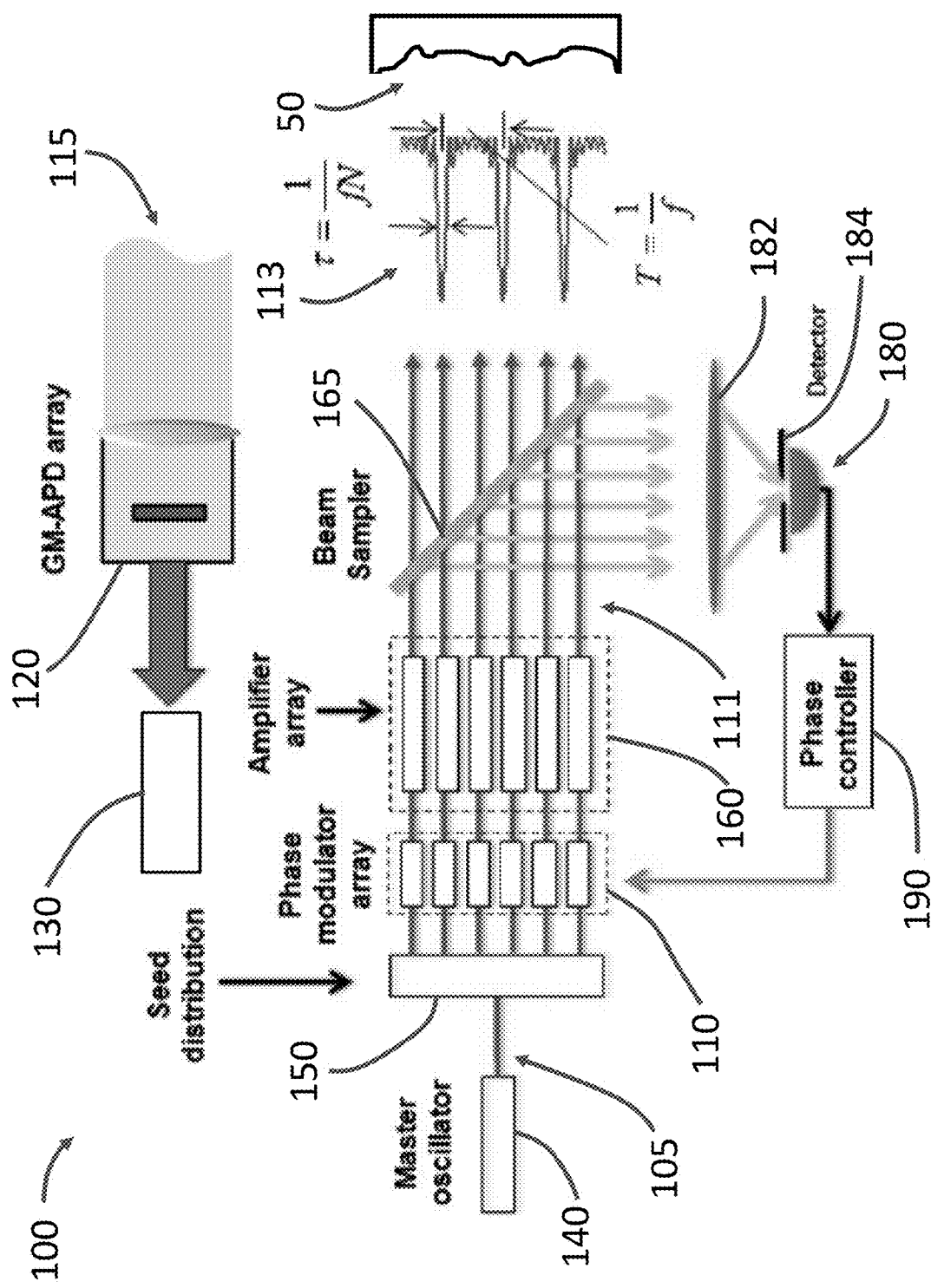
FIG. 1 shows a schematic of an imaging system using a continuous wave (CW) light source and single-photon detectors.

Pulsed LIDAR systems conventionally use laser pulses having a high peak power to obtain range information. Recent progress in laser technology has yielded various semiconductor light sources. However, semiconductor light sources normally have short upper-state lifetimes, which may limit energy storage. In addition, high peak intensity may cause optical damage. Therefore, it can be challenging to use semiconductor light sources for pulsed LIDAR applications.

Some LIDAR systems use continuous wave (CW) light sources to illuminate the scene. These systems typically transmit a continuous signal, and ranging can be carried out by modulating the intensity or frequency of the laser light. The travel time can then be derived from the phase or frequency difference between the received and transmitted signals. Therefore, these LIDAR systems normally do not operate in single-photon modes and the efficiency of photon usage is generally low.

To take advantage of the development of semiconductor lasers and the high efficiency of single-photon detection, methods and apparatus described herein integrate an optical phased-array transmitter with single-photon detectors. An array of CW sources is used to effectively pulse illuminate a target by electro-optically steering bright optical intensity patterns in the far field. From the reference frame of a point in the far field, a steered optical intensity pattern appears as a temporal pulse. Range information is thus obtained by measuring the pulse delay of the return to a pixel on a receiver.

For example, the optical phased array can include a one-dimensional (1D) transmitter array used for producing 1D fringes in the far field. In the array direction, the periodicity of the array leads to bright and dark fringes. In the orthogonal cross-range direction, there is no variation in the fringes, resulting in a 1D periodic pattern of bright and dark stripes in the far field. A stripe is image relayed onto a column of pixels in a 2D receiver array. As the fringes are steered, a column in the far field is effectively pulse illuminated, and the time-of-flight to the image relayed column of pixels in the 2D array is measured. As the fringes continue to steer along the array dimension, the returns are image relayed onto different columns in the 2D array. The photon arrival times in the 2D receiver array allows us to generate 3D images using a 1D array and a 2D receiver.

In this example, a CW semiconductor LIDAR system is built using an optical phased array that can offer benefits such as broad spectral coverage, high efficiency, small size, power scalability, and versatility. This system can enable the use of continuous-wave lasers to scale the power of the laser in a LIDAR application. In addition, this system can also entail the use of beam-steering to effectively pulse illuminate the scene by scanning an interference pattern (bright and dark bands) on and off a point in the scene. Advantages of this system include: a) CW semiconductor lasers can be used which enables a broader choice of wavelengths (broader spectral coverage including eye-safe wavelengths) with high-efficiency; b) the average power can be scaled by using a phased array enabling use at long ranges; and c) the beam-steering method enables arbitrary scanning in the far-field while maintaining high-brightness.

In addition, CW optical phased-array LIDAR systems also have good versatility. The swept fringe illumination provides a direct detect modality, enabling 3D imaging of the target. Alternatively, this phased-array concept can be extended to fiber lasers to achieve high power. Moreover, an optical phased array may be waveform modulated, enabling Doppler or laser communication in a coherent detection mode. For example, a frequency-chirped phase array may be used to determine the velocity of the target using conventional Doppler detection techniques where the chirp in the return beam is provides velocity information. The multi-functionality of the phased array may therefore eliminate the need for additional laser systems on a platform. Semiconductor sources also provide broad spectral coverage. Eye-safe wavelengths may be achieved with increased efficiency over solid-state sources, which are typically pumped by semiconductor lasers and incur a quantum-defect penalty.

LIDAR Systems Including CW Light Sources and Single-Photon Detectors

FIG. 1 shows a schematic of an imaging system 100 that uses both CW light sources and single-photon detection to image a scene. The system 100 shown in FIG. 1 includes a phased array 110 to illuminate a scene 50 with a time-varying optical intensity pattern 113 generated from a continuous wave (CW) light beam 105. The illumination causes photons 115 (also referred to as reflected photons, scattered photons, return photons, or return beam) to scatter or reflect from the illuminated portion of the scene. The system 100 also includes at least one single-photon detector 120, in optical communication with the scene, to detect the photons 115 that are scattered or reflected by the portion of the scene. The system 100 also includes a processor 130 that is operably coupled to the single-photon detector 120. In operation, the processor 130 and estimates a distance between the single-photon detector 120 and the portion of the scene based on a time of flight of the photons 115.

The time-varying optical intensity pattern 113 includes at least a bright portion that can illuminate the scene and cause reflection or scattering of photons in the bright portion. From the point-of-view of a point in the scene that is being illuminated, the time-varying optical intensity pattern 113 appears as a temporal pulse, because the point is illuminated by the bright portion only for a finite period of time before the time-varying optical intensity pattern 113 changes its pattern. By image relaying the point in the scene onto the single-photon detector 120, the single-photon detector can also appear to be pulse illuminated, thereby allowing single-photon detection. The arrival time of the pulse thus provides range information.

The Phased Array:

The phased array 110 in the system 100 receives the CW light beam 105 and generates the time-varying optical intensity pattern 113 to illuminate the scene. In general, the phased 110 includes an array of elements, each of which receives a respective portion of the CW light beam. Each element then applies phase modulation (e.g., a phase shift) to the received portion of the CW light beam 105. Sometimes the element can also apply intensity modulation to the received portion of the CW light beam 105. At the output of the phased array 110, respective portions of the phased modulated CW light beam 105 can interact with each other and form a desired intensity pattern (e.g., via interference).

Applying different phase shifts to different portions of the CW light beam 105 received by the phase modulators can also modulate (also referred to as "steer") the resulting intensity pattern. The phased array 110 can steer the generated intensity pattern in at least two ways. In the first way, the phased array 110 can change the incident direction of the intensity pattern so as to sweep the intensity pattern across the scene to be imaged, i.e., the intensity pattern as a whole can move around the scene. In the second way, the phased array 110 can change the intensity distribution of the intensity pattern as if only a portion of the intensity pattern is scanning across the scene. For example, the intensity pattern can be a fringe pattern including a periodical distribution of alternating bright and dark fringes within an area. The phased array 110, by tuning the phase shift applied to each portion of the CW light beam 105, can change the distribution of fringes as if they are rolling across the area (e.g., like a rolling escalator). Tuning the phase shift (and the speed of tuning) applied to each portion of the CW light beam 105 can also change the temporal period of the fringes (e.g., time interval for one fringe to illuminate a certain scene point twice). In this application, unless otherwise specified, beam steering by the phased array can be through either the first way, or the second way, or both.

In some examples, the phased array 110 includes a one-dimensional (1D) array of phase modulators (e.g., shown in FIG. 1). 1D phased arrays can produce intensity patterns that vary in 1D, such as various types of interference fringes (including an interference pattern having a single bright fringe). In some examples, the phased array 110 includes a two-dimensional (2D) array of phase modulators. 2D phased arrays can produce more complex and even arbitrary intensity patterns. Some 2D patterns may include a spot.

The phased array 110 can be constructed using various materials and phase modulation techniques. In some examples, the phased array 110 includes an array of liquid crystal cells, which can be fabricated using existing techniques such as those used in liquid crystal displays. Applying a voltage over a liquid crystal can change the refractive index of the liquid crystal, thereby changing the phase of light propagating in the liquid crystal. Liquid crystals also have high birefringence, so they can create a large optical path difference (OPD) between one polarization and another polarization with modest voltages.

In some examples, the phased array 110 can be based on multiplexed volume holography. In these examples, a limited number of gratings that steer to large angles can be written into a holographic recording medium. A particular grating can be addressed by small angle steering in front of the hologram. A second small angle steering device can be used behind the hologram to provide continuous angle steering between the angles produced by the holograms.

In some examples, the phased array 110 includes a birefringent prism. In these examples, a series of prisms can be used to steer to one of two states depending on the polarization of the incident light. Electronically controlled waveplates can be used to alter the polarization before each prism to choose the binary direction of steering. The phased array 110 can use fixed, modulo 2π, sawtooth-profile birefringent phase gratings. These gratings can provide wide angle step-steering stages. The last wide-angle step-steering approach can be described as circularly polarized liquid crystal birefringent polarization gratings (also referred to as liquid crystal polarization gratings, or LCPGs). LCPGs can generate phase shift using polarization rotation.

In some examples, the phased array 110 can include microelectromechanical system (MEMS) devices. This MEMS approach can implement a variable period approach to beam steering by fabricating a series of mirrors that move perpendicular to the substrate, imparting a piston phase to light reflected off the surface.

In some examples, the phased array 110 can employ the electro-optic effects in different materials, including lithium tantalite ((LiTaO$_3$), lithium niobate (LiNbO$_3$), magnesium-oxide-doped lithium niobate (MgO:LiNbO3), and Potassium titanyl phosphate (KTP) crystals. The refractive index of these materials can be dependent on an applied electric field. Therefore, applying a voltage across the electrodes of an electro-optic material can change the effective refractive index, thereby inducing the phase change as the light passes through the material. The applied voltage can be either direct current (DC) or alternating current (AC). AC voltage is normally used when periodic modulation of the phase shift applied over the light is desired. Various modulation frequency (also referred to as drive frequency) can be used. In one example, the modulation frequency can be about 1 MHz to about 20 GHz. In another example, the modulation frequency can be about 10 MHz to about 5 GHz. In yet another example, the modulation frequency can be 100 MHz to about 1 GHz. In yet another example, travelling wave electrodes can be used. In travelling electrodes, the electrical signal, which applies the voltage to change the refractive index of the electro-optic materials, propagates along the same direction as the optical wave does. Modulation frequency greater than 50 GHz can be achieved.

In some examples, arrays of waveguides can also be constructed using, for example, AlGaAs, for the beam steering of the phased array 110. More details and examples can be found in P. F. McManamon, et al., *A review of phased array steering for narrow-band electrooptical systems*, Proc. IEEE 97, 1078-1096 (2009), which is incorporated herein by reference in its entirety.

In some examples, the system 100 uses a narrow-linewidth source, such as a semiconductor laser or a fiber laser, to seed an array of slab-coupled-waveguide semiconductor amplifiers (SCOWAs). Each SCOWA is capable of producing a diffraction-limited beam with power of up to 1 W. Dephasing occurring from non-common optical path drift between array elements can be mitigated by periodically toggling between a phase-lock cycle and a beam steering cycle. During the phase-lock cycle, the phases can be synchronized via a stochastic-parallel-gradient-descent (SPGD) algorithm, which is a hill climbing-based algorithm requiring no phase knowledge, no reference waveform, and only a single detector. During the beam steering cycle, commercial LiNbO$_3$ phase modulators can be used to steer the beam by applying a time-varying phase profile across the elements. Due to the power scalability of the SCOWAs and the fast response time of the phase modulators, this system can be readily scaled to multi-watt class output and GHz steering speed. More details can be found in W. R. Huang, et al., *High speed, high power one-dimensional beam steering from a 6-element optical phased array*, Optics Express, 20, 17311 (2012), which is incorporated herein by reference in its entirety.

In some examples, the phased array 110 can include a two-dimensional (2D) array of phased modulators. For example, the phased array 110 includes an optical phased array formed of a large number of nano-photonic antenna elements which can project complex images into the far field. The optical phased array, including the nano-photonic antenna elements and waveguides, can be formed on a single chip of silicon using complementary metal-oxide-semiconductor (CMOS) processes. Directional couplers can evanescently couple light from the waveguides to the nano-photonic antenna elements, which emit the light as beams with phases and amplitudes selected so that the emitted beams interfere in the far field to produce the desired pattern. In some cases, each antenna in the phased array may be optically coupled to a corresponding variable delay line, such as a thermo-optically tuned waveguide or a liquid-filled cell, which can be used to vary the phase of the antenna's output (and the resulting far-field interference pattern). More details of these example optical phased arrays can be found in U.S. Pat. No. 8,988,754, which is incorporated herein by reference in its entirety.

The Single-Photon Detector:

The single-photon detector 120 in the system 100 shown in FIG. 1 can detect and/or record several types of information of the return photons 115. In some examples, the single-photon detector 120 includes an array of detectors, each of which can be regarded as a pixel in the array. In practice, it can be helpful for the single-photon detector 120 to have the following properties: 1) high detection efficiency, i.e., high probability that a photon is successfully detected every time it hits the detector; 2) low dark current, i.e., low probability that the detector registers a photon when none is there; 3) low reset or "dead time", i.e., a short interval after a detection during which the device cannot detect a new photon; 4) low cross-talk, i.e., low probability that neighboring pixels detect photons arising from the detection process in a given pixel; and 5) low "timing jitter", i.e., low uncertainty in specifying when a photon arrives.

In one example, the single-photon detector 120 can include an array of avalanche photodiodes (APDs), which are reverse-biased variants of p-n junction photodiodes. Typically, one pixel includes one APD, one biasing circuit, one timing circuit, and an interface to the readout circuitry (e.g., shift registers) for the array. Without being bound any particular theory or mode of operation, reversely biasing a p-n junction photodiode can generate an electric field in the vicinity of the junction. The electric field tends to keep electrons confined to the n side and holes confined to the p side of the junction. Absorption of a photon having sufficient energy (e.g., >1.1 eV for silicon) can produce an electron-hole pair. The electron in the electron-hole pair drifts to the n side and the hole drifts to the p side, resulting in a photocurrent flow in an external circuit.

The same principle also allows an APD to detect light. However, an APD is typically designed to support high electric fields so as to facilitate impact ionization. More specifically, the electron and/or the hole in an electron-hole pair generated by photon absorption can be accelerated by the high electric field, thereby acquiring sufficient energy to generate a second electron-hole pair by colliding with the crystal lattice of the detector material. This impact ionization can multiply itself many times and create an "avalanche." A competition can develop between the rate at which electron-hole pairs are being generated by impact ionization and the rate at which they exit the high-field region and are collected. The net result can be dependent on the magnitude of the reverse-bias voltage: if the magnitude is below a value (commonly known as the breakdown voltage), collection normally outruns the generation, causing the population of electrons and holes to decline. An APD operating in this condition is normally referred to as a linear mode APD. Each absorbed photon normally creates on average a finite number M (also referred to as the internal gain) of electron-hole pairs. The internal gain M is typically tens or hundreds.

While M might be the average number of electron-hole pairs generated by one absorbed photon, the actual number may vary, inducing gain fluctuations. This gain fluctuation can produce excess noise, or multiplication noise, which typically gets progressively worse with the increase of M. Therefore, once the point is reached where the multiplication noise dominates over the noise introduced by downstream circuitry, further increases in gain may reduce the system's signal-to-noise ratio (SNR). The multiplication noise can also depend on material properties because, in general, electrons and holes have different likelihood to initiate impact ionizations. For example, in Si, electrons tend to be much more likely to impact ionize compared to holes. Therefore, it can be helpful for electrons to initiate impact ionization in silicon-based APDs.

In another example, the single-photon detector 120 can include an APD operating in Geiger mode (also referred to as a Geiger-mode APD or GmAPD). A GmAPD operates when the reversely biased voltage is above the breakdown voltage. In this case, electron-hole pair generation normally outruns the collection, causing the population of electrons and holes in the high-field region and the associated photocurrent to grow exponentially in time. The growth of photocurrent can continue for as long as the bias voltage is above the breakdown voltage.

A series resistance in the diode, however, can limit the current growth by increasing the voltage drop across the series resistance (thereby reducing the voltage across the high-field region) as the current grows. This effect can therefore slow down the rate of growth of the avalanche. Ultimately, a steady-state condition can be reached in which the voltage across the high-field region is reduced to the breakdown voltage, where the generation and extraction rates balance. Stated differently, the series resistance can provide negative feedback that tends to stabilize the current level against fluctuations. A downward fluctuation in current, for example, can cause a decrease in the voltage drop across the series resistance and an equal increase in the drop across the APD high-field region, which in turn increases the impact-ionization rates and causes the current to go back up.

The quenching circuit of the APD employed for the system 100 can be either passive or active. In a passive-quenching circuit, the APD is charged up to some bias above breakdown and then left open circuited. The APD then discharges its own capacitance until it is no longer above the breakdown voltage, at which point the avalanche diminishes. An active-quenching circuit actively detects when the APD starts to self-discharge, and then quickly discharges it to below breakdown with a shunting switch. After sufficient time to quench the avalanche, the active-quenching circuit then recharges the APD quickly by using a switch. In LIDAR systems, where the APD typically detects only once per cycle, the recharge time can be slow. There is also interest, however, in using the Geiger-mode APDs to count photons to measure optical flux at low light levels. With a fast active-quenching circuit, the APD can be reset shortly after each detection (e.g., on a time scale as short as nanoseconds), thereby allowing the APD to function as a photon-counting device at much higher optical intensities.

In yet another example, the single-photon detector 120 can include an array of superconducting nanowire single-photon detectors (SNSPDs), each of which typically includes a superconducting nanowire with a rectangular cross section (e.g., about 5 nm by about 100 nm). The length is typically hundreds of micrometers, and the nanowire can be patterned in compact meander geometry so as to create a square or circular pixel with high detection efficiency. The nanowire can be made of, for example, niobium nitride (NbN), tungsten silicide (WSi), $YBa_2Cu_3O_{7-\delta}$, or any other material known in the art.

In operation, the nanowire can be maintained below its superconducting critical temperature Tc and direct current biased just below its critical current. Without being bound by any particular theory of mode of operation, incident photons having sufficient energy to disrupt hundreds of Cooper pairs in a superconductor can therefore form a hotspot in the nanowire. The hotspot itself typically is not large enough to span the entire width of the nanowire. Therefore, the hotspot region can force the supercurrent to flow around the resistive region. The local current density in the sidewalks can increase beyond the critical current density and form a resistive barrier across the width of the nanowire. The sudden increase in resistance from zero to a finite value generates a measurable output voltage pulse across the nanowire.

Various schemes can be employed in SNSPD to improve the detection performance. In one example, the SNSPD can employ a large area meander strategy, in which a nanowire meander is written typically across a 10 μm×10 μm or 20 μm×20 μm area so as to increase the active area and thereby improve the coupling efficiency between the incident photons and the SNSPD. In another example, the SNSPD can include a cavity and waveguide integrated design, in which a nanowire meander can be embedded in an optical cavity so as to further increase the absorption efficiency. Similarly, a nanowire can be embedded in a waveguide so as to provide a long interaction length for incident photons and increase absorption efficiency. In yet another example, ultra-narrow nanowires (e.g., 20 nm or 30 nm) can be employed to construct the nanowire meander so as to increase the sensitivity to low-energy photons.

In yet another example, the single-photon detector 120 can include a transition edge sensor (TES), which is a type of cryogenic particle detector that exploits the strongly temperature-dependent resistance of the superconducting phase transition. In yet another example, the focal plane array 130 can include a scintillator counter which can detect and measure ionizing radiation by using the excitation effect of incident radiation on a scintillator material, and detect the resultant light pulses.

In some examples, the single-photon detector can include a 32×32 GM-APD array, which uses a continuous read-out integrated circuit (ROIC) to record the arrival time of incident photons relative to a 500 MHz clock. Once powered, the APD array can be in an armed state and can be ready to fire on an incident photon. Once an avalanche event has been triggered by an arriving photon, a quench circuit can be activated to quench the APD. A reset time to rearm the APD pixels is about 2 μs.

Typically, the GM-APD array operates in a regime with less than one photoelectron on a pixel per reset time. Since the arriving photons can be described by Poisson statistics, the arrival of two or more photons on a pixel during a reset time can be unlikely. Arrival of two or more photons on a pixel may blind a pixel to the arrival of subsequent photons due to the finite reset time associated with registering the arrival of the first photon. In this example, the input to the receiver can be significantly attenuated.

High temporal resolution may be obtained by matching the receiver array to the transmitter. For illustrating purposes only, a filled aperture array including N top-hat array sub-aperture elements with width w and period P=w can be employed such that the far field includes a single fringe. For a filled-aperture array, there can be N spatially resolvable fringe positions within the far field. Similarly, there can be N temporally resolvable pulse intervals, time and space being related by the fringe velocity (t=x/v). It therefore can be desirable to have at least as many pixels in one dimension of the receiver as there are number of elements in the transmitter to temporally or range resolve a far-field object.

The total number of elements in the receiver array can therefore scale as $\sim N^2$, with a fringe width matched to a pixel width on the receiver. The receiver scaling can be generalized to a non-filled aperture array with multiple fringes. For M fringes, each with N pixels along a dimension of the array, the total number of pixels in the array can scale as $(MN)^2$ in order to match the receiver field of view (FOV) to the transmitter.

There can be tradeoffs between a filled and non-filled aperture transmitter with the same sub-aperture w and far-field envelope (λR/w). The non-filled aperture can generally have a larger period and array aperture (NP). The cross-range resolution $\Delta R_c = \lambda R/NP$ can improve with the increased array aperture, but may at the expense of more receiver pixels. A filled aperture can allow for efficient matching of a fraction of the transmit envelope to a receiver FOV by restricting the scan range of a single fringe. For a non-filled aperture, matching the receiver FOV to a fraction of the transmit envelope may result in some efficiency loss, since not all of the transmitted fringes are utilized. In this example, about 3 of the 42 fringes are utilized in generating a 3D image. A better matched receiver to the transmit envelope can improve the system efficiency.

The Processor:

The processor 130 in the system 100 is operably coupled to the single-photon detector 120 and processes data generated by the single-photon detector 120. In particular, the processor 130 can estimate a distance between the single-photon detector 120 and the portion of the scene based on a time of flight of the return photons 115. The processor 130 can be coupled to the single-photon detector 120 via a Readout Integrated Circuit (ROIC) (not shown in FIG. 1). In operation, the ROIC can read out the photocurrent generated by the single-photon detector 120, time stamp the photon arrivals, read out the pixel locations of the received photons, and convey the information off the ROIC and into the processor 130.

In some examples, the processor 130 can include either a Field Programmable Gate Array (FPGA) or an Application Specific Integration Circuit (ASIC). In one example, the FPGA approach can be employed for its relatively simple design. An FPGA is generally a semiconductor device containing programmable logic components conventionally referred to as "logic blocks" and programmable interconnects. Logic blocks can be programmed to perform the function of basic logic gates such as AND, and XOR, or more complex combinational functions such as decoders or mathematical functions. For example, a VIRTEX-7 FPGA, manufactured by XILINX, can deliver 2 million logic cells, 85 Mb block RAM, and 3,600 DSP48E1 slices for new possibilities of integration and performance.

In another example, the ASIC approach can be employed for its often more powerful computation capability. An ASIC is generally an integrated circuit designed for a particular use, rather than intended for general-purpose use. Example ASICs include processors, RAM, and ROM. Therefore, ASIC can be more complicated, and thus more expensive, than FPGA. In practice, the decision of using a FPGA or an ASIC may depend on several factors, such as the budget, time constraint, and fabrication capabilities.

In yet another example, the processor 130 in the system 100 can be a microprocessor, microcontroller, or CPU. In yet another example, the processor 130 may be any electronic device that can analyze and/or process data and generate one or more 3D images. To this end, the processor 120 may include or be associated with a computing device, such as a portable computer, personal computer, general purpose computer, server, tablet device, a personal digital assistant (PDA), smart phone, cellular radio telephone, mobile computing device, touch-screen device, touchpad device, and the like.

Sources of CW Light Beams:

The system 100 shown in FIG. 1 further includes a CW light source 140 that provides the CW light beam 105 for the phased array 110. A seed distributor 150 (e.g., beam splitter, directional couplers, etc.) can be disposed between the light source 140 and the phased array 110 so as to split the CW light beam 105 into multiple portions, each of which can be received by one element in the phased array 110. In addition, each element in the phased array 110 can be further coupled to a respective amplifier in an amplifier array 160. The amplifier array 160 can amplify the modulated light beam from the phased array 110 so as to increase the overall brightness of the beam. The amplifier array 160 can also apply different amplification ratios to different portions of the CW light beam 105 so as to, for example, improve the quality of the resulting intensity pattern (e.g., in contrast and/or uniformity).

In some examples, the light source 140, the seed distributor 150, the phase array 110, the amplifier array 160 are optically coupled to each other via free space. In some examples, the optical communication among these components can be implemented using waveguides, including but are not limited to, fibers or semiconductor waveguides. In some examples, the optical communication can use a combination of free space and waveguides.

The light source 140 can use various types of light sources. In one example, the light source 140 can include a fiber laser, which typically has good spatial and spectral qualities and can be configured to operate in continuous, modulated, or pulsed mode. The output wavelength of a fiber laser may be tunable and can be eye-safe. The core of the fiber can be doped with one or more rare-earth elements, such as erbium (Er), ytterbium (Yb), neodymium (Nd), dysprosium (Dy), praseodymium (Pr), thulium (Tm), holmium (Ho). Nd- or Yb-doped silica fiber provide emission around 1 µm. Yb-doped silica fiber can be a promising platform for high power applications due to the high optical to optical conversion efficiency. Er-doped silica fiber lasers and amplifiers can operate at around 1.55 µm. Emission at 2 µm can be achieved by thulium or holmium-doped silica or germanate fibers.

In another example, the light source 140 can include a semiconductor laser. The semiconductor laser can produce diffraction-limited emission by, for example, a ridge waveguide having a width of about several microns so as to preferably lase (amplify via stimulated emission) the fundamental mode. The semiconductor laser can also produce spectrally stabilized emission using a Bragg grating integrated into the semiconductor chip so as to construct a distributed Bragg reflector (DBR) laser or a distributed feedback (DFB) laser. Semiconductor optical amplifiers, either monolithically or hybrid integrated with the master oscillator, can be used to increase the output energy of the laser. The amplifiers can be constructed in a multi-stage configuration, in which case the amplifiers can also be employed to control the repetition rate, either as pulse picker to select individual pulses or as optical gate to generate an optical pulse out of a continuous wave (CW) master oscillator with desired spectral properties.

In yet another example, the light source 140 can include a semiconductor laser based on based on two InGaAsP/InP monolithic Master Oscillator Power Amplifiers (MOPAs) operating at, for example, about 1.57 µm. Each MOPA can include a frequency stabilized Distributed Feedback (DFB) master oscillator, a modulator section, and a tapered amplifier. The use of a bended structure (the oscillator, the modulator, and the amplifier are not arranged along a straight line) may avoid undesired feedback and thus provide good spectral properties together with high output power and good beam quality.

In yet another example, the light source 140 can include a parametric light source such as an optical parametric oscillators (OPOs) and/or an optical parametric amplifier (OPAs), which are typically tunable and can generate emission at wavelengths from the ultraviolet to the mid-infrared range. OPOs and OPAs can have the benefit of good spectral property, high electrical-to-optical efficiency, ruggedness, and small volume.

The Feedback System:

The system 100 further includes a beam splitter 165 disposed at the output of the phased array 110 so as to direct part of the near field time-varying optical intensity pattern 111 toward a photodetector 180. A collecting lens 182 can be used to collect light of the near field time-varying optical intensity pattern 111 and a pinhole or other spatial filter 184 can be used to control which portion of the near field time-varying optical intensity pattern 111 is to be monitored by the photodetector 180. In one example, the photodetector 180 can monitor the intensity of the center portion of the near field time-varying optical intensity pattern 111. In another example, the photodetector 180 can monitor any other portions of the near field time-varying optical intensity pattern 111. The detected intensity can then be transmitted to a phase controller 190, which, based on the detected intensity, can adjust the phase shift applied to each portion of the CW light beam 105 in the phase modulator 110. Through this feedback system including the detector 180 and the phase controller 190, the phase array can generate the time-varying optical intensity pattern 113 with desired properties, including brightness, spacing, contrast, or any other properties applicable here.

Methods of Imaging Using CW Light Beams and Single-Photon Detection

Figure 2:
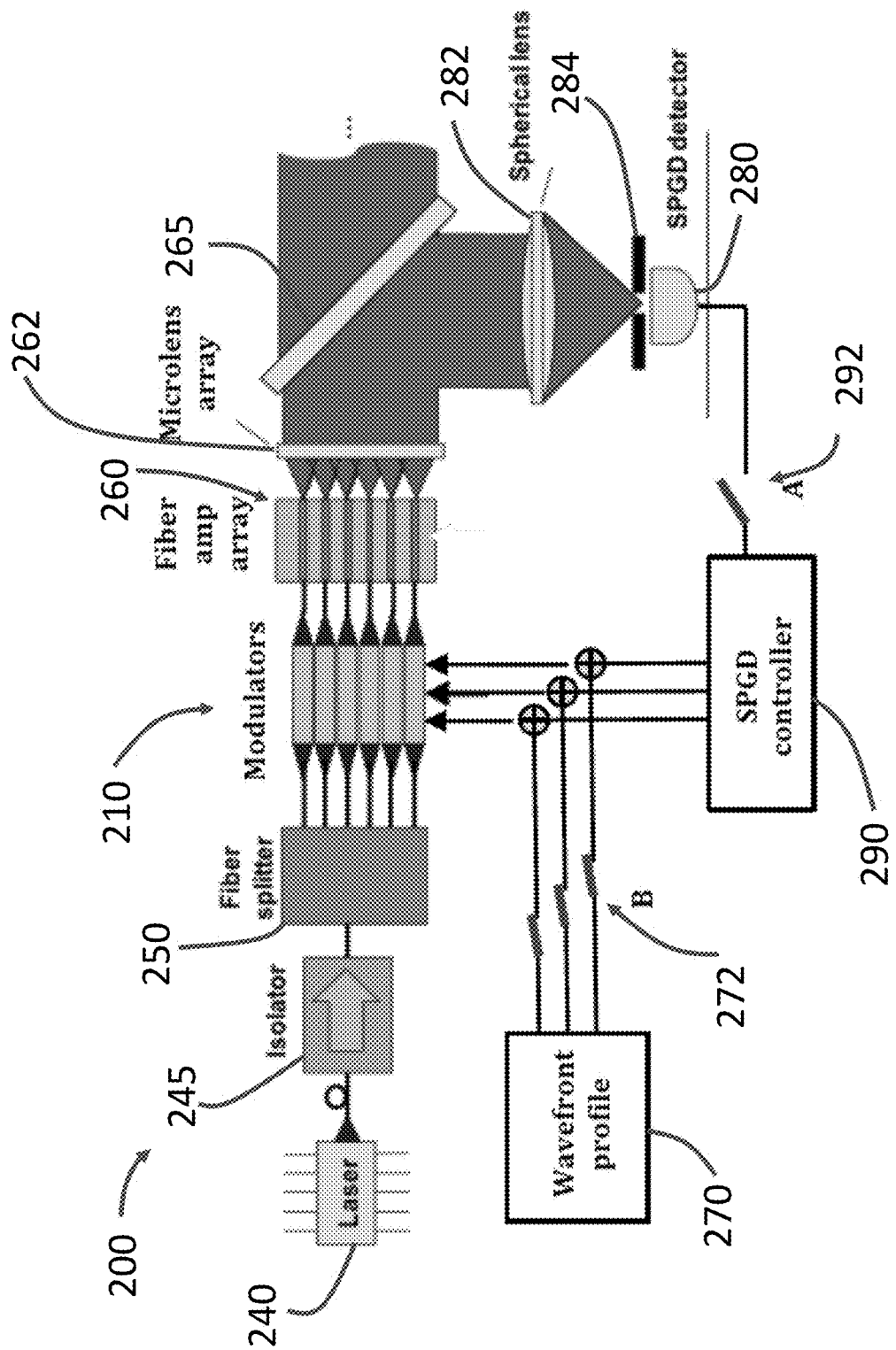
FIG. 2 shows a schematic of an imaging system that can perform multiplexing of phased array maintenance and imaging.

FIG. 2 shows a transmitter 200 that can be used with a receiver to image a scene using CW light beams and single-photon detection. The transmitter 200 includes a light source 240 that delivers a CW light beam toward an isolator 245, which prevents light (e.g., reflections) from feeding back into the light source 240. After the isolator 245, the CW light beam is split into multiple portions by a fiber splitter 250 so as to feed a phased array 210 that includes multiple phase modulators. Modulators in the phased array 210 modulate the different portions of the CW light beam to create a temporally varying optical intensity pattern. An array of amplifiers (for example fiber, solid state, or semiconductor amplifiers) 260 then amplifies the output of the phased array 210. A micro-lens array 262 disposed at the output of the fiber amplifiers 260 increases a fill factor of the fiber amplifiers 260.

A beam splitter 265 directs part of the temporally varying optical intensity pattern toward a detector 280, which is disposed behind a collecting lens 282 and a pinhole 284. The detector signal from the detector 280 is transmitted to a phase controller 290 via a first switch 292. The phase controller 280, based on the detected signal, controls the phases applied to the phased array 210 so as to improve the quality of the resulting temporally varying optical intensity pattern. The transmitter 200 also includes a wavefront profile controller 270 that is operably coupled to the phased array 210 via a plurality of second switches 272 (collectively referred to as second switch 272). Each phase modulator in the phased array 210 can be connected to a respective channel, via a respective switch in the second switch 272, in the wavefront profile controller 270 so as to allow independent control over each phase modulator.

With reference to, but not limited to, the systems 100 shown in FIG. 1 and the transmitter 200 shown in FIG. 2, a method of imaging a scene includes generating a temporally varying optical intensity pattern from at least one continuous wave (CW) light beam (e.g. using the phased array). The generated temporally varying optical intensity pattern is then used to illuminate at least one portion of the scene so as to cause a photon to scatter or reflect off the at least one portion of the scene. A single-photon detector is then used to detect the photon reflected or scattered from the at least one portion of the scene. The method then estimates a distance between the single-photon detector and the at least one portion of the scene based on the temporally varying optical intensity pattern and a time of flight of the detected photon.

Generation of Temporally Varying Optical Intensity Patterns:

The temporally varying optical intensity pattern can convert a CW light beam into a virtual "pulse" so as to illuminate the scene and allow ranging based on single-photon detection. The temporally varying optical intensity pattern can be generated using a phased array according to various methods. One of the methods can be a stochastic parallel gradient descent (SPGD) technique, which can be implemented using the system shown in FIG. 2, when the first switch 292 is closed, i.e., when the detector 280 is connected to the phase controller 290.

The initial alignment of the phased array can start with applying a first phase dither $\delta D$ (e.g., with a magnitude of about $2\pi/40$) having a first sign on the phased array and measuring a first intensity of a center portion of the temporally varying optical intensity pattern. The method then applies a second phase dither $-\delta D$ having a second sign opposite to the first sign and measuring a second intensity of the center portion of the temporally varying optical intensity pattern. A slope S of an intensity change can be calculated using the first intensity and the second intensity. Using the slope S, an updated phase correction $\Delta\varphi_2$ can be calculated as $\Delta\varphi_2=\Delta\varphi_1+S*\delta D$, where $\Delta\varphi_1$ is the phase shift applied by the phased array before applying the first phase dither $\delta D$. At the very beginning, the phase shift can be a random phase shift. This dither-measurement-update cycle can be repeated until the slope S is substantially close to zero. In general, the first phase dither $\delta D$ and the second phase dither $-\delta D$ have the same magnitude but opposite signs.

The first phase dither $\delta D$, the second phase dither $-\delta D$, the slope S, the first phase shift $\Delta\varphi_1$, and the second phase shift $\Delta\varphi_2$ are all vector quantities including an array of elements, each of which is a respective phase dither or phase shift applied to a corresponding phase modulator in the phased array. In one example, the phased array includes N phase modulators distributed in a one-dimensional array, and the first phased dither $\delta D$ is also a one-dimensional array $\delta D=[\delta D_1, \delta D_2, \delta D_3, \ldots, \delta D_N]$. In another example, the phased array includes M×N phase modulators distributed in a two-dimensional array (i.e., a matrix), then the first phase dither $\delta D$ can include an array of elements $\delta D=\delta D(i, j)$, wherein i is from 1 to M and j is from 1 to N.

Steering of Temporally Varying Optical Intensity Patterns:

When imaging the scene, the phased array can steer the temporally varying optical intensity pattern. As introduced before, the steering can include sweeping the optical intensity pattern across the scene or varying the optical intensity pattern (e.g., rolling the fringes of an interference pattern). In one example, a method of steering the temporally varying optical intensity pattern includes applying a steering phase shift "(N-1)$\Delta\phi$" on the Nth phase modulator in a phased array that includes an array of phase modulators. In other words, the steering phase shifts applied to the modulators in the phased array steps in increments of $\Delta\phi$, e.g., [0; $\Delta\phi$; $2\Delta\phi$; $3\Delta\phi$; . . . ; (N-1)$\Delta\phi$]. Then the basic phase shift $\Delta\phi$ can be varied from 0 to $2\pi$ so as to sweep at least a portion of the temporally varying optical intensity pattern across the at least one portion of the scene. For example, varying $\Delta\phi$ from 0 to $2\pi$ for a fringe pattern can shift the fringe pattern in one dimension by one fringe. The pattern after steering and before the steering can have the same intensity distribution, but a point in the scene is illuminated by one fringe for a finite time (i.e., the time it move the fringe by one fringe width). Then the process can repeat for multiple times to as to collect more photons for imaging.

The time it takes to complete a cycle of varying $\Delta\phi$ can be dependent on the material of the phase modulator, the electronics in the phase controller, and/or the data collection capacity of the detector. This time is also referred to as modulation time, and the inverse of modulation time is conventionally referred to as modulation frequency. In one example, the phase modulator can include liquid crystals and the modulation frequency can be greater than 1 KHz (e.g., about 1 KHz to about 10 KHz). When using other phase modulators, such as electro-optic modulators, the modulation frequency can be greater than 1 MHz (e.g., about 1 MHz to about 20 GHz, about 10 MHz to about 1 GHz, or about 100 MHz to about 500 MHz). The modulation time can affect the temporal resolution of the resulting LIDAR system. In general, a shorter modulation time can lead to a higher temporal resolution, since the virtual pulse simulated by the CW light beam has shorter effective pulse duration.

In some examples, the temporally varying optical intensity pattern can include a fringe pattern generated by a system including a master oscillator split into N beams to feed an optical phased array (e.g., shown in FIG. 2). The fringes in the far field are consistent with the Fourier transform of the near field, and the number of fringes is inversely proportional to the fill factor, which is a ratio of the emitter aperture (w) to the array period (P). Typically, a microlens array is used to increase the fill factor and reduce the number of fringes.

The fringe(s) in the far field can be scanned by applying an incremental phase shift [0; $\Delta\phi$; . . . (N-1)$\Delta\phi$] to each array element where N is the number of elements within the array. To scan a full inter-fringe spacing (i.e., to steer a fringe to its neighboring fringe position), the phase shift $\Delta\phi$ can be varied by $2\pi$. The dwell time of a fringe on a point in the far field can be given by:

$$\tau=W/v \quad (1)$$

where W is the width of the fringe at range R and v is the scan velocity. The width of a far-field fringe is approximately $W\approx\lambda R/(NP)$, and $\Lambda\approx\lambda R/P$ is the separation between fringes. The phased-array aperture can scale linearly with the number of elements N, and the far-field fringe width therefore can scale inversely $W \propto (1/N)$ with the array count. If the array elements are phase modulated to scan the far-field inter-fringe spacing $\Lambda$ in a time T, the dwell time becomes $$\tau=T/N=1/(fN) \quad (2)$$

The dwell time (pulse duration) generally scales inversely with the number of elements and can become shorter with faster drive frequencies (f=1/T). The range resolution can be given by $\Delta R=c\tau/2$, where c is the speed of light, and the factor of two accounts for the round trip. Using Equation (2), the range resolution may be expressed as:

$$\Delta R=c/(2Nf) \quad (3)$$

The unambiguous range can be determined by the repetition rate of the fringes. Since the fringes are swept past the target in a periodic fashion, it can be challenging to unambiguously determine that a return is associated with a particular period of the repetitive scan. Similar to conventional LIDAR systems, the unambiguous range may be expressed as:

$$R_u=c/(2f) \quad (4)$$

where the factor of 2 accounts for a round trip. The number of resolution bins $\Delta R$ within an unambiguous range $R_u$ can be proportional to the number of elements in the array. Applying conventional radar techniques can increase the unambiguous range, e.g., the repetition rate may be varied among subsequent scans.

In some examples, a near-unity fill factor can be used to result in approximately one fringe. A typical system may have more than 100 elements operating at sweep rates of f~20 MHz resulting in a $\Delta R$~7.5 cm resolution. In the example illustrated here, a six-element optical phased array with a range resolution $\Delta R$~0.5 m is used and the corresponding unambiguous range is $R_u$=7.5 m.

The emitter aperture in this example includes a w=6 μm modal field diameter with a period of P=250 μm, generating approximately 42 fringes in the far field. The relative phase shift between elements can be sinusoidally modulated at f=20 MHz with a relative phase function $\Delta\phi=\pi \sin(2\pi ft)$. For the sinusoidal scan, the fringe position varies according to $y(t)=(\lambda R/2P) \sin(2\lambda ft)$. The average magnitude of the velocity is therefore $v=2\lambda R/(PT)$. This average velocity in Eq. (1) can be used to yield an average pulse width of $\tau=(1/2fN)=3.6$ ns in this example. This pulse duration can result in an average range resolution of $\Delta R\approx0.5$ m. In some examples, linear-phase functions may be used to achieve constant velocity fringes and therefore constant pulse widths.

Multiplexing of Phased Array Alignment and Steering:

The initial alignment of the phased array can generate the temporally varying optical intensity patterns with desired properties (e.g., a high brightness). During imaging, this initial alignment may gradually fade. Therefore, it can be beneficial to check the alignment of the phased array and make corrections to the alignment (also referred to as maintenance) during imaging. Maintenance can be carried out using SPGD methods similar to the methods for initial alignment. Maintenance can be multiplexed with steering of the temporally varying optical intensity pattern without disrupting the streamlined imaging process.

Figure 3:
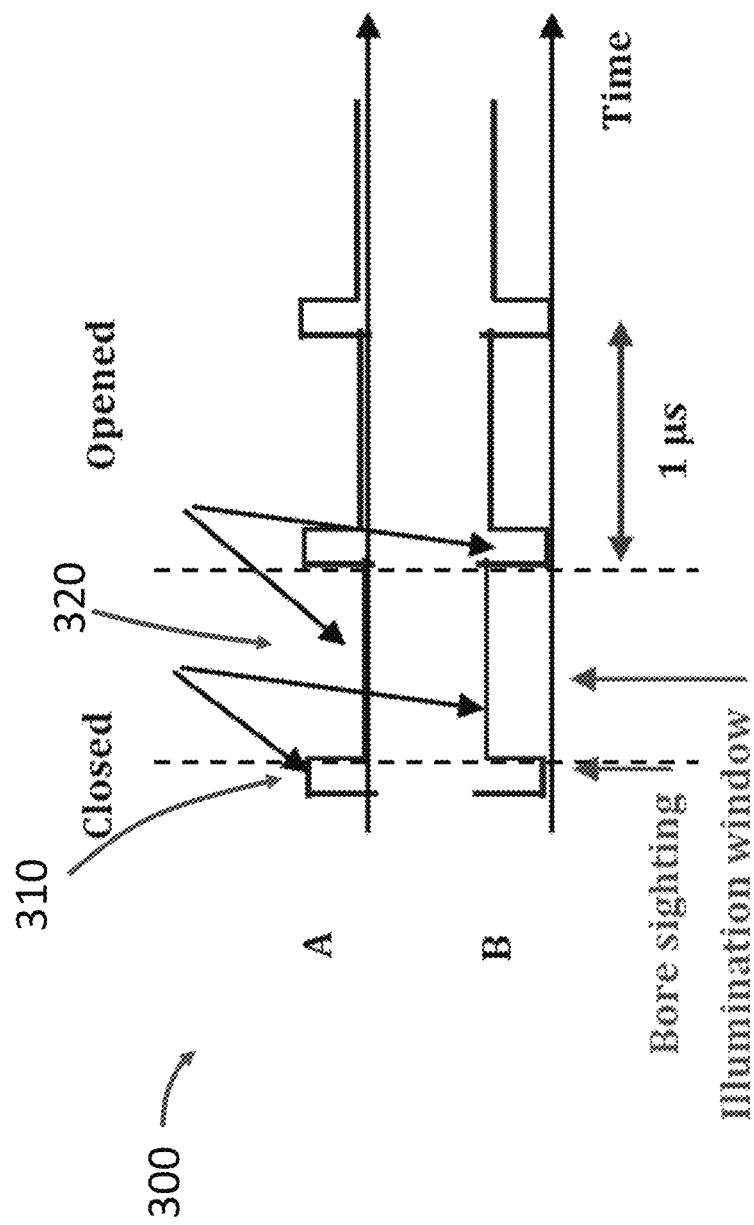
FIG. 3 shows a timing diagram illustrating the multiplexing of phased array maintenance and imaging.
Figure 4:
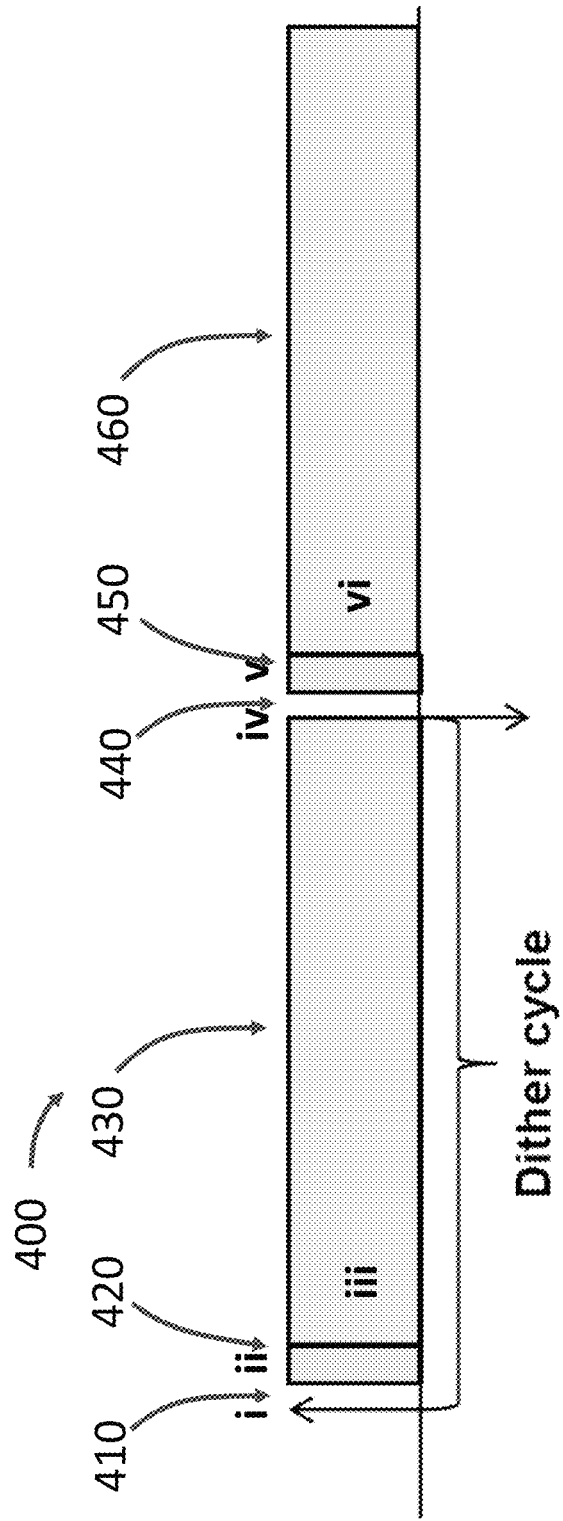
FIG. 4 shows a timing diagram illustrating methods of multiplexing of phased array maintenance and imaging within one dither cycle.

Example methods of multiplexing maintenance and steering can be illustrated with respect to FIGS. 2-4. In FIG. 2, if the first switch 292 (switch A) is closed and the second switch 272 (switch B) is open, the system 200 can perform initial alignment of the phased array 210. As described above, in initial alignment, a positive dither can be applied to a correction based on a previous dither cycle followed by a measurement of the intensity of the temporally varying optical intensity pattern in response to the dither. Then a negative dither can be applied and a second measurement is performed. A correction is then calculated based on the first measurement and the second measurement. The calculated correction is then applied during the start of the next cycle. This process can repeat during the entire imaging process so as to, for example, maintain a high brightness of the temporally varying optical intensity pattern. If the phase dither and the subsequent measurements can be fast enough, the time between dithers can be used to steer the temporally varying optical intensity pattern for imaging.

FIG. 3 shows a timing diagram 300 of the first switch 292 and the second switch 272 so as to illustrate multiplexing of phased array maintenance and beam steering. The timing diagram 300 shows three dither cycles, each of which can be further divided into a first section 310 and a second section 320. In the first section 310 (also referred to as bore-sighting section), the first switch 292 is closed and the second switch 272 is open. During bore-sighting section 310, phase dithers can be quickly applied to the phased array 210 and measurements of the temporally varying optical intensity pattern by the detector 280 in response to the phase dither are also carried out. This dither and measurement can correct misalignment of the phased array and maintain a desirable brightness of the resulting temporally varying optical intensity pattern. In the second section 320 (also referred to illumination window), the first switch 292 is open and the second switch 272 is closed. During this illumination window 320, the phased array is modulated so as to steer the temporally varying optical intensity pattern so as to carry out the imaging operation.

The frequency of the dither cycles can depend on the time it takes for the phased array to be significantly away from its initial alignment (e.g., when the brightness of the resulting temporally varying optical intensity pattern is only half of the peak value). For example, without any maintenance, it may take the phased array 100 ms to misalign significantly. Then the dither frequency can be set at around 1 KHz (one dither every 1 ms) to allow multiple dither cycles to correct the potential alignment within the 100 ms time period. In some examples, the dither frequency can be about 100 Hz to about 100 KHz. In some examples, the dither frequency can be about 1 KHz to about 10 KHz.

The percentage of the first section 310 in one dither cycle can be dependent on the speed of the electronics for phase modulation and data collection. The electronics is can be the circuitry to apply the modulation signal for the phased array 210 and to collect the intensity data of the resulting time-varying optical intensity pattern in response to the modulation signal. In general, faster electronics can allow a smaller percentage of the first section in each cycle and therefore reduce the interference with the beam steering. In some examples, the percentage can be about 0.1% to about 10% of the dither cycle, in which case about 90% to about 99.9% of the cycle time can be used for beam steering and imaging. In some examples, the percentage can be about 1% to about 2% of the dither cycle. In some examples, the first section can be completed within 50 ns. In some examples, the first section can be completed within 10 ns. In some examples, the first section can be completed within 5 ns. With the development of fast electronics, the first section can be arbitrarily short so as to further reduce the influence on the imaging operation.

FIG. 4 shows a timing diagram 400 of two dither cycles to illustrate more specific steps that can be performed in the multiplexing of phased array maintenance and beam steering. The two dither cycles include six sections (section 410 to section 460). In section 410, an up-dither ("+δD") is applied to the phased array 210, and a subsequent measurement is performed in section 420. In the remainder of the time in the first dither cycle (section 430), arbitrary steering can be performed by turning on the waveform generation while turning off the phase maintenance (in FIG. 2, the second switch 272 is closed while the first switch 292 is open). At the end of the first dither cycle, the second switch 272 is opened and the first switch 292 is closed to perform a down dither ("−δD") in section 440 and the corresponding measurement in section 450. Then the phased array can again be used for beam steering in section 460.

In some examples, the dither and measurement (first section) in a dither cycle can be performed without adjusting the first switch 292 and the second switch 272. More specifically, during steering, the variable phase shift $\Delta\phi$ in the phase shift $[0; \Delta\phi; 2\Delta\phi; 3\Delta\phi; \ldots; (N-1)\Delta\phi]$ applied over the phased array varies between 0 and $2\pi$. The dither and measurement can then be performed when the variable phase shift $\Delta\phi$ is substantially close to zero in order to reduce or eliminate the effect of the phase dither on the steering.

In some examples, the temporally varying optical intensity pattern include a fringe pattern created by a 1D array of phase modulators (e.g., shown in FIG. 2). The method of beam steering can include an open loop arbitrary steering function onto the array which allows the array to generate arbitrary patterns. Periodically, and on times of small duration relative to the period, the arbitrary steering function can be forced to return to zero (a bore sight location) in order to allow SPGD to dither the phases or perform measurements. For the remainder of the time interval, the array can be free to steer in an arbitrary fashion without impacting the performance of the phase-control algorithm. Since the return to zero time can be made small relative to the duration of the scan (for example <1% of the scanning time), the scanning appears to be continuous with minimal disruption as a result of the <1% phase maintenance time.

The SPGD method, also referred to as a hill climbing method, is used to phase the array such that it generates high-contrast fringes in the far field. SPGD can be an adaptive control method used to optimize the on-axis intensity in the far field. The advantage of SPGD can be that it does not require direct knowledge of the individual phases of the array elements. The array output can be sampled by placing a pinhole in front of a detector. The pinhole can be much smaller than the central lobe width $(\Delta W \approx (\lambda F/NP))$ of the fringe pattern, where F is the transform lens focal length used to generate the far field.

A random phase dither (δD) can be applied to the array elements followed by measurements of the response. Subsequently, the same dither can be applied with an opposite sign (−δD). Based on the response to the two dither measurements, a slope (S) of the measured change in intensity to the applied phase dither can be determined. A correction $(\Delta\phi_{new})$ to the initial phase distribution across the array $(\Delta\phi_{old})$ can be subsequently applied, which includes a summation of the initial phase distribution and the phase dither multiplied by the measured slope $(\Delta\phi_{new}=\Delta\phi_{old}+S\delta D)$. This process can continue iteratively until the slope becomes zero, in which case a maximum is obtained, and no further corrections are applied $(\Delta\phi_{new}=\Delta\phi_{old})$. At the end of this cycle, the optimal phase offsets can be held fixed followed by an open-loop steering cycle in which a relative phase difference $[0; \Delta\phi; \ldots; (N-1)\Delta\phi]$ is applied to the array elements.

The open-loop steering can be performed during a time interval shorter than the dephasing time of the array, which can be dependent on the intrinsic phase noise and environmental disturbances (typically ~300 ms in this example). After the beam-steering cycle, the steering phase offsets are nulled, and the SPGD method can be resumed. The convergence time of the SPGD method, on average, can be given by $\tau_c=(k2(N-1)/f_d)$, where k is a constant between 2 and 4, and $f_d$ is the dither frequency. In this example, the dither frequency is $f_d=2$ kHz. Conservatively, a 100 ms time interval can be sufficient to achieve SPGD convergence for phase maintenance followed by a 100 ms open-loop steering cycle. Alternative SPGD implementations are also possible, which may allow for continuous steering.

The SPGD method includes dithering the phases of the array elements, measuring the response to the dither, and implementing a correction to optimize the measured fringe signal on a detector. Steering the phased array includes adding a steering phase function to the array elements. If the steering phase function occurs simultaneously with the dither during a measurement, the measured response to the dither may be interfered by the presence of the steering phase offset. However, the steering phase function has periodic zero crossings. The SPGD measurements can be synchronized to sample the SPGD detector during narrow windows centered on the zero crossings of the steering phase function. In this case, interference between the beam steering and the SPGD measurements can be reduced or eliminated. Equivalently, one may visualize a steered fringe periodically sweeping past the detector. Sampling the fringe during the time intervals corresponding to the fringe overlap with the detector results in strobing the fringe. From the sampled SPGD detector point of view, the fringe appears stationary.

Estimation of Three-Dimensional (3D) Images of the Scene:

Data collected by the single-photon detectors can be used to construct 3D images of the scene. The raw data collected by single-photon detectors is normally referred to as point clouds. A point cloud can include a plurality of data points, each of which has a two dimensional coordinate (x, y) and a corresponding range information z derived from the time-of-flight of the photon that creates this data point. The arrival times of the pulses on the receiver can be compared to the times at which the transmitter was pointing a bright portion of the time-varying optical intensity pattern at the corresponding image relayed location in the far-field so as to derive the time of flight of the photons. Furthermore, in the case of Geiger-mode APD receivers, a particular point in the scene can be illuminated for multiple times. Correspondingly, a particular return (beam path) from the scene point in the far field to a receiver pixel from a point in the far-field can also occur for multiple times in order to obtain sufficient signal relative to the noise on the receiver. Histograms may be generated to count all the returns in a particular time bin relative to the repetition rate of the returns.

In some examples, fringe patterns are used to emulate illuminating the scene with pulses of light. In these examples, each pixel on the receiver sees one fringe, which appears to sweep across the scene. Each pixel coordinate $(x_0, y_0)$ can be mapped to an angle $(\theta_x, \theta_y)$. The sweeping fringe appears to pulse illuminate an angle $(\theta_x, \theta_y)$, i.e., one angle in the fringe sweep is mapped onto a pixel. The time the fringe was pointed at angle $(\theta_x, \theta_y)$ can be recorded as time t0. The detector can also record the time at which it receives a return (referred to as time t). The time of flight is the t-t$_0$. The range can be determined from $r=c(t-t_0)/2$.

Images Obtained with CW Light Beams and Single-Photon Detection

Figures 5A, 5B, 5C:
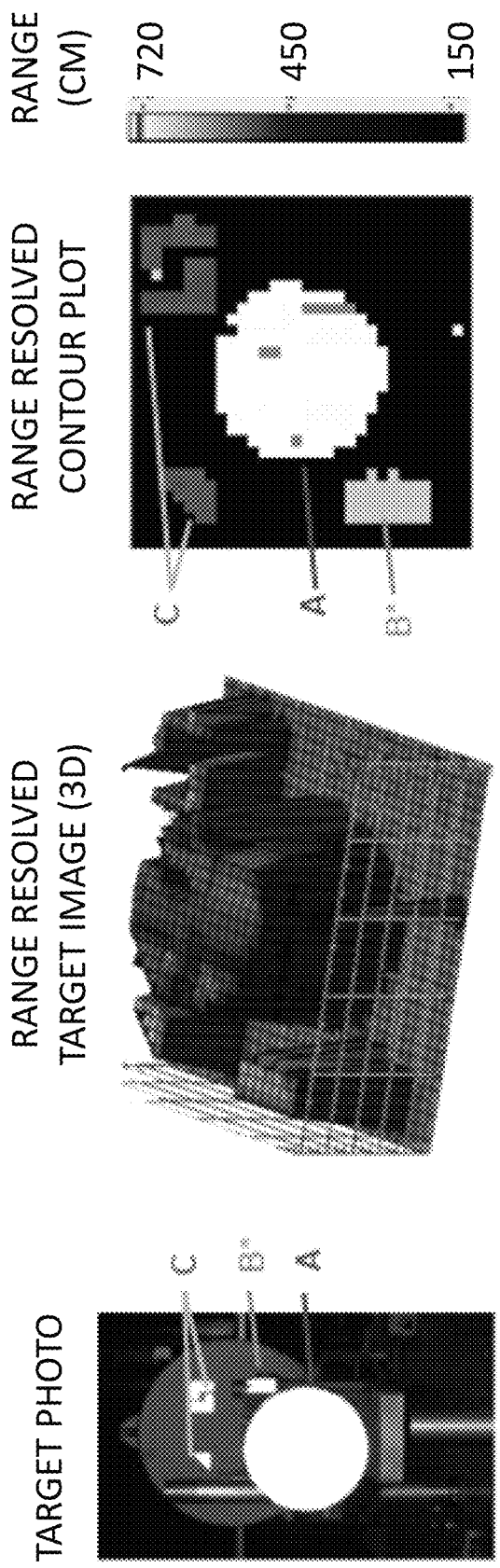
FIG. 5A is a photograph of a target to be imaged in the far field.
FIG. 5B shows a 3D plot of range-resolved targets using systems and methods illustrated in FIGS. 1-4.
FIG. 5C shows a contour plot of range-resolved targets using systems and methods illustrated in FIGS. 1-4.

FIGS. 5A-5C show experimental results of an example implementation of the LIDAR system shown in FIG. 1. FIG. 5A shows a photograph of the targets. FIG. 5B shows a 3D image obtained with the LIDAR system, and FIG. 5C shows a 2D range-resolved contour plot derived from the LIDAR data. Four objects are placed at three different image planes. The nominal range to the target complex is approximately 16 m. The resolved object range is accurate to within the unambiguous range interval of 7.5 m. The distance between the first target plane (circular object labeled A) and the second plane (rectangle labeled B) is inferred to be 1.0 m, while the distance between the second and third target plane (object pair labeled C: rectangle and MIT Lincoln Laboratory logo) is estimated to be 1.6 m. These distances are consistent with the spacing between objects in the laboratory (1.0 and 1.5 m, respectively).

Comparing the time of arrival of the photon at a given pixel relative to the time when the phased array is pointing at a given pixel provides the range information, resulting in the range-resolved images shown. Specifically, histograms of the arrival times of the photons can be generated. A mean time of arrival is assigned to the peaks in the histogram. Several pulses can be used to integrate the returns while maintaining a good signal-to-dark-count ratio. The cross-range resolution $\Delta R_c = \lambda R/NP$ can be limited by the transmitter array aperture NP in order to match a pixel on the receiver to a fringe width. In this example, the cross-range resolution is $\Delta R_c \approx 9$ mm at the 16 m distance to the target complex.

Conclusion

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of designing and making the technology disclosed herein may be implemented using hardware, software or a combination thereof. When implemented in software, the software code can be executed on any suitable processor or collection of processors, whether provided in a single computer or distributed among multiple computers.

Further, it should be appreciated that a computer may be embodied in any number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes (outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A method of imaging a scene, the method comprising:
generating a spatiotemporally varying optical intensity pattern with an array of phased modulators;
illuminating a portion of the scene with the spatiotemporally varying optical intensity pattern so as to cause a photon to scatter or reflect off the portion of the scene;
detecting the photon reflected or scattered from the portion of the scene; and
estimating a distance to the portion of the scene based on the spatiotemporally varying optical intensity pattern and a time of flight of the photon.

2. The method of claim 1, wherein generating the spatiotemporally varying optical intensity pattern comprises modulating continuous-wave beams with the array of phased modulators.

3. The method of claim 2, wherein illuminating the portion of the scene comprises steering the spatiotemporally varying optical intensity pattern across the portion of the scene during a time interval shorter than a dephasing time of the continuous-wave beams.

4. The method of claim 2, further comprising:
periodically phase-locking the continuous-wave beams together.

5. The method of claim 4, wherein periodically phase-locking the continuous-wave beams together comprises measuring intensity changes in the spatiotemporally varying optical intensity pattern caused by dithering relative optical phases of the continuous-wave beams.

6. The method of claim 4, wherein periodically phase-locking the continuous-wave beams together comprises simultaneously steering the spatiotemporally varying optical intensity pattern and aligning phases of the continuous-wave beams.

7. The method of claim 1, wherein illuminating the portion of the scene comprises sweeping the spatiotemporally varying optical intensity pattern across the portion of the scene.

8. The method of claim 1, wherein illuminating the portion of the scene comprises sweeping a bright fringe in the spatiotemporally varying optical intensity pattern across the portion of the scene within up to about 5 ns.

9. An apparatus for imaging a scene, the apparatus comprising:
- a phased array to illuminate a portion of the scene with a spatiotemporally varying optical intensity pattern so as to cause a photon to scatter or reflect from the portion of the scene;
- at least one detector, in optical communication with the phased array, to detect the photon scattered or reflected by the portion of the scene; and
- a processor, operably coupled to the at least one single-photon detector, to estimate a distance between the at least one detector and the portion of the scene based on a time of flight of the photon.

10. The apparatus of claim 9, wherein the phased array is configured to sweep the spatiotemporally varying optical intensity pattern across the portion of the scene.

11. The apparatus of claim 9, wherein the phased array is configured to sweep a bright fringe in the spatiotemporally varying optical intensity pattern across the portion of the scene within up to about 5 ns.

12. The apparatus of claim 9, wherein the phased array comprises an array of phased modulators to from the spatiotemporally varying optical intensity pattern by modulating continuous-wave beams.

13. The apparatus of claim 12, wherein the phased array is configured to steer the spatiotemporally varying optical intensity pattern across the portion of the scene during a time interval shorter than a dephasing time of the continuous-wave beams.

14. The apparatus of claim 12, further comprising:
- a light source to generate a continuous-wave beam;
- a beam splitter, in optical communication with the light source, to split the continuous-wave beam into the continuous-wave beams; and
- an array of optical amplifiers, in optical communication with the beam splitter, to amplify the continuous-wave beams.

15. The apparatus of claim 12, further comprising:
- circuitry, operably coupled to the phased array, to periodically phase-locking the continuous-wave beams together.

16. The apparatus of claim 15, wherein the circuitry comprises:
- a photodetector, in optical communication with the phased array, to measure intensity changes in the spatiotemporally varying optical intensity pattern caused by dithering relative optical phases of the continuous-wave beams; and
- a controller, operably coupled to the photodetector, to change a phase setting of at least one phase modulator in the array of phase modulators based at least in part on the intensity measured by the photodetector.

17. The apparatus of claim 15, wherein the circuitry is configured to steer the spatiotemporally varying optical intensity pattern and align phases of the continuous-wave beams simultaneously.

18. The apparatus of claim 9, wherein the at least one detector comprises an array of single-photon detectors.

* * * * *